United States Patent [19]

Schwärzler et al.

[11] Patent Number: 5,536,101
[45] Date of Patent: Jul. 16, 1996

[54] DRIVE ASSEMBLY FOR SLIDE-ON HUB

[75] Inventors: Peter Schwärzler, Glattbach; Rudolf Beier, Offenbach, both of Germany

[73] Assignee: GKN Automotive AG, Lohmar, Germany

[21] Appl. No.: 116,127

[22] Filed: Sep. 2, 1993

[30] Foreign Application Priority Data

Sep. 5, 1992 [DE] Germany .......................... 42 29 726.5

[51] Int. Cl.⁶ ...................................................... F16B 4/00
[52] U.S. Cl. ............................ 403/282; 403/294; 403/359
[58] Field of Search ........................................ 403/274, 278, 403/279, 281, 282, 359, 277, 284, 57, 74

[56] References Cited

U.S. PATENT DOCUMENTS

| | | |
|---|---|---|
| 2,848,803 | 6/1958 | Schock . |
| 3,370,441 | 2/1968 | Aucktor . |
| 3,396,554 | 8/1968 | Westercamp .................. 403/274 X |
| 4,124,318 | 11/1978 | Sagady ........................... 403/359 X |
| 4,514,108 | 4/1985 | Sagady ............................... 403/359 |
| 4,627,149 | 12/1986 | Colas .............................. 403/282 X |
| 4,813,808 | 3/1989 | Gehrke ........................... 403/359 X |
| 4,840,089 | 6/1989 | Welschof et al. .................. 403/57 X |
| 4,881,842 | 11/1989 | Farrell et al. .................... 403/359 X |
| 4,892,433 | 1/1990 | Schreiber ....................... 403/282 X |

FOREIGN PATENT DOCUMENTS

| | | |
|---|---|---|
| 1394532 | 2/1965 | France ................................. 403/359 |
| 2171716 | 9/1973 | France . |
| 2270473 | 12/1975 | France . |
| 2015947 | 10/1971 | Germany . |
| 7203824 | 7/1975 | Germany . |
| 61-32629 | 2/1986 | Japan . |
| 62-25324 | 2/1987 | Japan . |
| 2104624 | 3/1983 | United Kingdom . |

*Primary Examiner*—Kenneth J. Dorner
*Assistant Examiner*—Harry C. Kim
*Attorney, Agent, or Firm*—Harness, Dickey & Pierce

[57] ABSTRACT

A driveshaft assembly has external profiled teeth at its end and a slide-on hub with a shaft bore with corresponding inner profiled teeth. A first securing mechanism form-fittingly engages a groove or thread radially cut into the profiled teeth and provided at the free end of the driveshaft and axially supporting the hub in the direction of the end of the driveshaft. External profiled teeth, which are provided at the driveshaft and which, when the hub is fully slid on to the driveshaft while being in contact with the first securing mechanism, extend axially relative to the shaft shank and beyond the length of the hub. A second securing mechanism, with a radially undisturbed profile of the profiled teeth, is supported on the run-out of the profiled teeth or on an adjoining conical face of the driveshaft. The second securing mechanism is plastically formed in-situ and axially supports the hub in the direction of the shaft shank of the driveshaft.

11 Claims, 3 Drawing Sheets

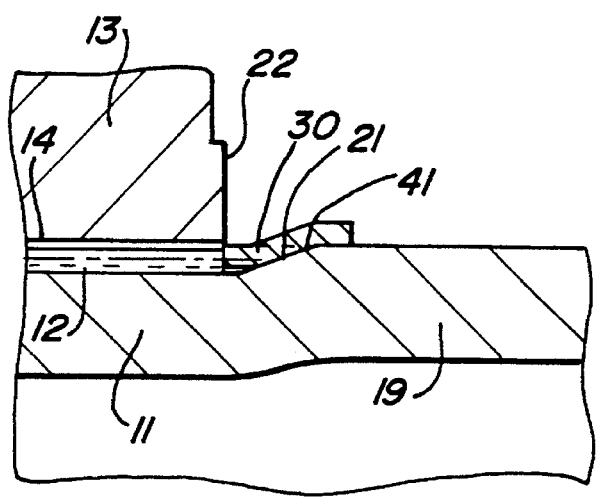
*Fig-3*
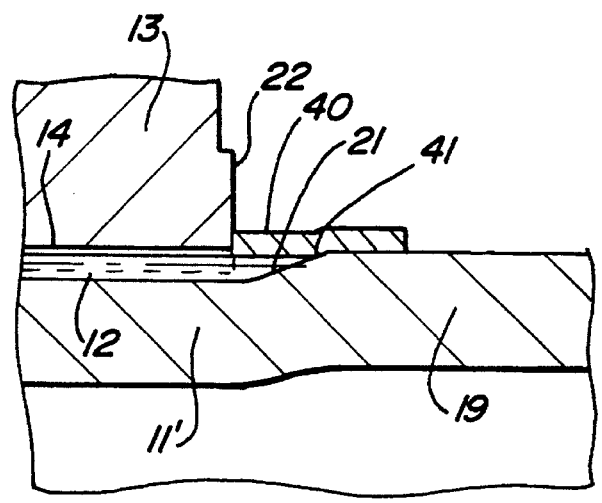
*Fig-4*
*Fig-5*
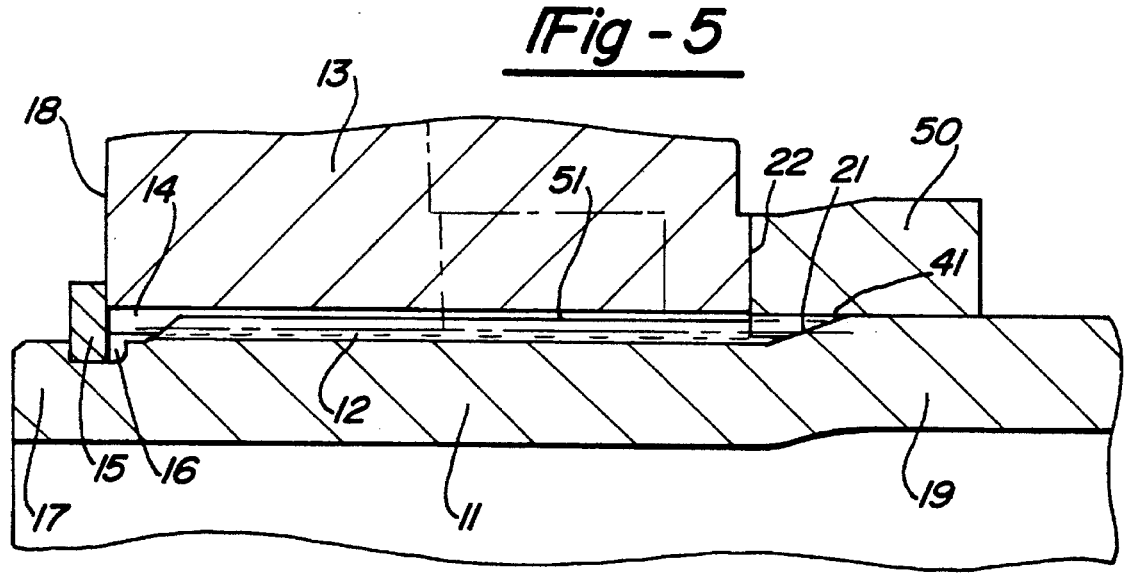

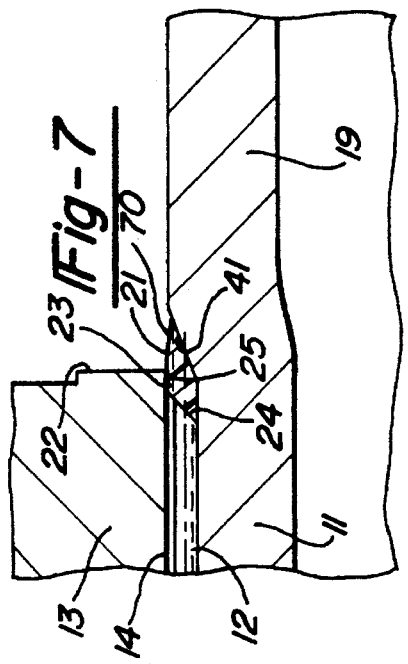
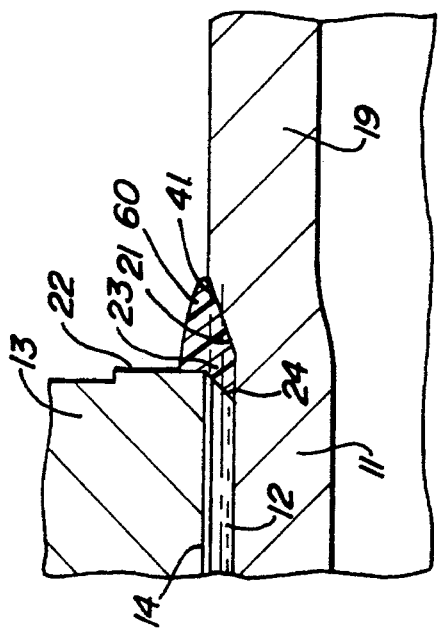
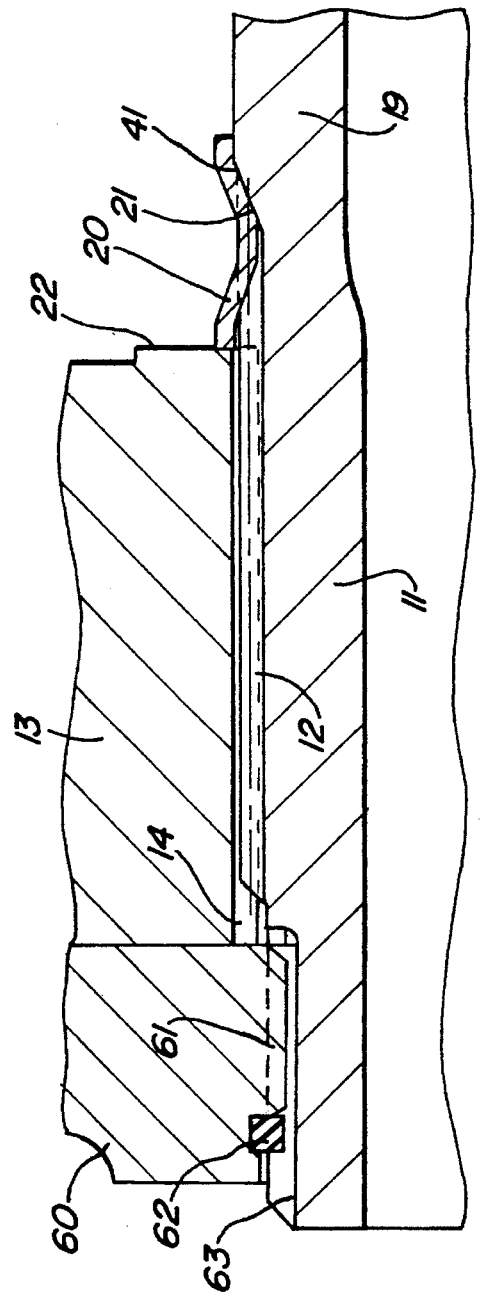

DRIVE ASSEMBLY FOR SLIDE-ON HUB

BACKGROUND OF THE INVENTION

The invention relates to a driveshaft assembly having external profiled teeth at its end and a slide-on hub with a shaft bore with corresponding inner profiled teeth. The outer profiled teeth at the driveshaft have a greater axial length than the hub with the inner profiled teeth. Also, an axial securing means is between the driveshaft and the slide-on hub. Especially in cases where a driveshaft is connected to a ball hub of a constant velocity universal joint, it is essential for the hub to be axially accurately secured to the shaft end.

There are several prior art designs of such assemblies some of which will be described below. Reference will also be made to their specific disadvantages.

According to a first prior art solution, a driveshaft is provided with a fixed radial stop shoulder in the direction of the shaft shank, as viewed from the hub, and the hub, via an end face, is made to stop against the stop shoulder. A securing element engaging an annular groove has a securing function at the shaft end. The problem in this case is that, because of the tolerances of the axial length of the hub and the thickness of the securing ring, the axial distance between the stop shoulder and annular groove has to be calculated very accurately. Furthermore, the axial length of the outer profiled teeth at the driveshaft relative to the position of the stop face has to be accurately observed. This is difficult when drawing the profiled teeth on the shaft. In view of the profile run-out at the driveshaft, the inner profiled teeth in the hub cannot extend along the entire length of the shaft bore.

According to a second prior art solution, while the first and second stop elements are basically the same, a space is provided between the hub and stop shoulder at the shaft shank end. This solution reduces the problem of accurately dimensioning the profile run-out which may axially extend beyond the length of the hub towards the shaft shank. The disadvantage of this design is that it is necessary to provide an additional annular part, with further tolerances having to be taken into account.

According to a third prior art solution, a securing ring is provided which simultaneously engages corresponding annular grooves cut into the profiled teeth of the driveshaft and the shaft bore of the hub. The disadvantage in this case refers to a notch effect in respect of the driveshaft and hub, especially if the grooves, with reference to the axial length of the hub, are orientated towards the adjoining shaft shank and, relative to the driveshaft, are thus positioned in the region of torque flow. Furthermore, with such solutions, the assembly and dismanning operations are complicated.

SUMMARY OF THE INVENTION

It is an object of the present invention to provide an assembly of the initially mentioned type which, while allowing less stringent tolerance requirements regarding the production of the profiled teeth at the driveshaft in respect of the position of the tooth run-out, permits the hub to be accurately positioned and secured on the driveshaft and prevents the parts from being weakened. The assembly includes a first securing means form-fittingly engaging a groove or thread radially cut into the profiled teeth and provided at the free end of the driveshaft and axially supporting the hub in the direction of the end of the driveshaft. External profiled teeth, which are provided at the driveshaft, and which, when the hub is fully slid on to the driveshaft while being in contact with the first securing means, extend axially relative to the shaft shank and beyond the length of the hub. A second securing means with a radially undisturbed profile of the profiled teeth, is supported on the run-out of same or on an adjoining conical face of the driveshaft and which are plastically formed in-situ and which axially support the hub in the direction of the shaft shank of the driveshaft.

The effect in accordance with the invention is that the axial position of the hub is determined entirely by the first securing means. The first securing means form-fittingly engage the profiled teeth with the interruption in the tooth profile being located outside the region of torque flow. The hub itself is not subject to any special measures, in particular, there is no need for recesses or grooves.

In accordance with the invention, since the length of the profiled teeth at the driveshaft is greater than the axial length of the hub, the run-out portions of the tooth profile may be provided with greater tolerances because the second securing means is formed in-situ so as to fit accurately between the hub and the profile run-out regions or the adjoining conical faces when the hub is slid on.

According to a first preferred embodiment, the first securing element includes a securing ring which engages an annular groove at the shaft end and which is in contact with a radial end face of the hub. In this case, the hub, at least, has to be axially slid on far enough to ensure that the annular groove is free to be engaged by the securing ring. This design also allows a slight axial play after the securing ring has been fitted.

According to a second advantageous embodiment, the first securing element includes a nut with anti-rotation means which engages an external thread at the shaft end and which is in contact with a radial end face of the hub. In this case, the hub is slid on while the second securing means is deformed by threading on the nut itself. This measure preferably allows the hub to be axially secured in a clearance-free way.

According to a first advantageous embodiment of the second securing element, the latter includes a prefabricated slide-on ring made of plastically deformable metal or plastics. Again, the axial length of the ring is dimensioned in such a way that, when the hub is fully slid on and secured by the first securing means, the ring is in contact with the hub and axially projects beyond the end of the profiled teeth or beyond the length of an adjoining conical face. The inside of the ring is originally smooth and through radial deformation it is inwardly, at least partially, formed into the profiled teeth so that it is axially supported on the tooth run-out or, if it is not formed into the profiled teeth, it is at least deformed to such an extent that it axially rests against the conical face.

According to a second advantageous embodiment of the second securing element, the latter includes a prefabricated slide-on ring made of plastically deformable metal or plastics. Again, its axial length is dimensioned in such a way that it is axially fitted and shortened when the hub is slid into its final position. As in the previous case, a secure and accurate fit is ensured without having to wait for a hardening phase. The ring in question may be designed in such a way that, from the start, it form-fittingly engages the profiled teeth at the shaft end, or its inside may be smooth, in which case it has to adapt itself, through conical widening, to a conical face adjoining the end of the profiled teeth, with the amount of radial widening corresponding to the degree of axial adjustment.

In a third embodiment, the second securing element includes a ring which is produced in situ of a hardenable formable material. In cross-section, the element engages the profiled teeth of the driveshaft. The formable material referred to here is used only in respect of its deformation and hardening characteristics, whereas there is no need for an adhesive connection with the surfaces of the parts. This means that the material may be any plastically deformable, hardenable mass, such as metallic filler materials for example. After the hub has been slid into its final position, the mass is applied in an annular shape to the tooth run-out regions of the driveshaft, with its width being such that it is formed in axially between an end face of the hub and the profile run-out portions of the shaft and/or on the adjoining conical faces. In a preferred embodiment, the hub is provided with an annular recess which forms a conical supporting face which, together with the longitudinal axis, forms an angle similar to that formed by the run-out of the profiled teeth of the driveshaft. The object is to prevent the formed-in ring from widening under axial loads. This can be achieved especially if the thickness of the ring is outwardly tapered in a wedge-like way or by providing an additional inner cylindrical holding face on the hub.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention will be explained below with reference to the drawing wherein:

FIG. 3 is a partial section view of a second embodiment of an assembly according to FIG. 1 in the region of the second securing means.

FIG. 4 is a partial section view of a third embodiment of an assembly according to FIG. 1 in the region of the second securing means.

FIG. 5 is a partial section view of a fourth embodiment of an assembly according to FIG. 1 in the region of the second securing means.

FIG. 6 is a partial section view of a fifth embodiment of an assembly according to FIG. 1 in the region of the second securing means.

FIG. 7 is a partial section view of a sixth embodiment of an assembly according to FIG. 1 in the region of the second securing means.

FIG. 8 is a view like FIG. 2 of another embodiment of the present invention.

Identical parts appearing in the figures have been given the same reference numbers, and the reference numbers of parts corresponding to one another differ by 10.

DETAILED DESCRIPTION OF THE PREFERRED EMBODIMENTS

Figure 1:
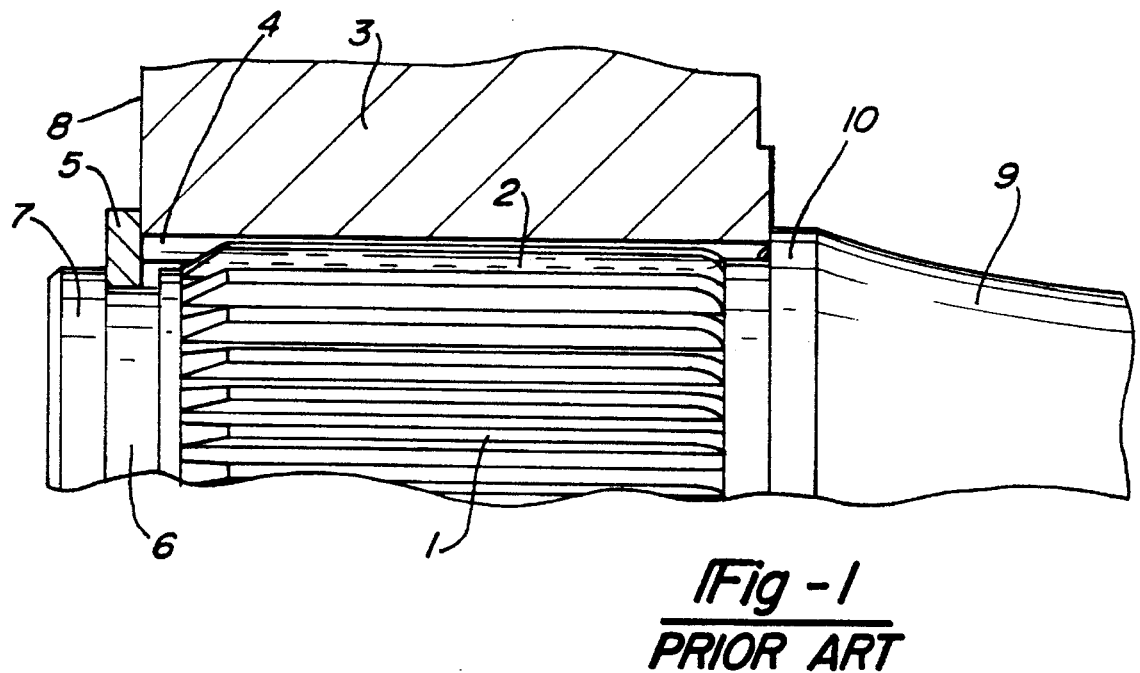
FIG. 1 is a plan view partially in section of an assembly in accordance with the state of the art, having a shaft end with a collar stop for the slide-on hub.

FIG. 1 shows a driveshaft 1 with outer profiled teeth 2 and a hub 3, with inner profiled teeth 4, with the teeth 2 and 4 engaging one another. The hub 3 is shown in its finish-assembled position on the driveshaft 1 where, with its end face, it abuts the collar 10 designed to be integral with the shank 9 of the driveshaft 1. At the same time, the hub 3 is axially secured by a securing ring 5, which engages an annular groove 6 in the projecting free shaft end 7 of the driveshaft 1 with its outer end face 8 stopped against the securing ring 5.

Figure 2:
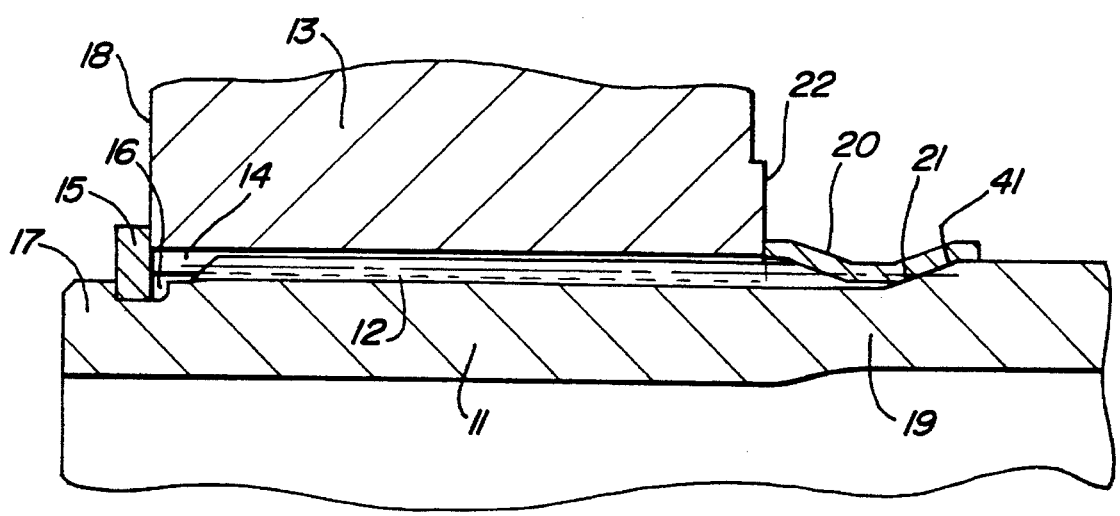
FIG. 2 is a half longitudinal section view of an assembly in accordance with the invention, with a shaft end, a hub and first and second securing means.

FIG. 2 shows a driveshaft 11 with outer profiled teeth 12 and a hub 13, with inner profiled teeth 14, with the profiled teeth 12, 14 engaging one another. The hub 13 is shown in its final axial position on the driveshaft 11, which is demonstrated by the position of a securing ring 15 in an annular groove 16 at the projecting free shaft end 17 of the driveshaft 11, with the securing ring 15 simultaneously being in contact with the outwardly facing end face 18 of the hub 13. The securing ring 15 and the annular groove 16 form the first securing means for the hub 13.

At the end of the hub 13 facing the shaft shank 19, the profiled teeth 12 of the shaft project beyond the length of the hub 13. A sleeve 20 together with the shaft run-out 21 of the profiled teeth 12 forms the second securing means. Also, a conical annular shoulder 41 adjoins the tooth run-out 21. In its center, the sleeve 20 is radially drawn in and form-fittingly engages the profiled teeth 12. The second end face 22 of the hub 13 is supported on the sleeve 20 which, through being radially formed in, is axially positioned between the tooth run-out 21 and the end face 22.

In FIG. 3, the driveshaft 11 is shown in the region of the connection with the shaft shank 19, and the hub 13 is shown in the region of the second end face 22. A slightly modified sleeve 30 is radially deformed at one end only and engages the teeth 12 in such a way that, on its inside, it is axially supported on the tooth run-out, thus forming a second stop for the hub 13. Also, a conical annular shoulder 41 adjoins the tooth run-out 21. The sleeve 30 and tooth run-out form the second securing means.

FIG. 4 deviates from FIGS. 2 and 3 in that it shows a driveshaft 11 which, at the shaft shank 19 end, includes a conical annular shoulder 41 which adjoins the tooth run-out 21. The sleeve 40 is deformed radially inwardly in such a way that it supports the end face 22 of the hub 13, with the deformed sleeve 40 itself being axially supported on the conical annular shoulder 41. The sleeve and annular shoulder form the second securing means. In this case, it is not proposed that the sleeve should engage the tooth run-out 21, although this would additionally be possible.

FIG. 5 shows a configuration which largely corresponds to the final position illustrated in FIG. 3, but as illustrated in phantom, an annular member 50 originally including a smaller outer diameter and, via inner profiled teeth 51, engaged the outer profiled teeth 12 of the driveshaft 11. By axially sliding on the hub 13, the annular member adjusted itself between the tooth run-out 21 and the end face 22 of the hub 13 positioned towards the shaft shank 19. Also, a conical annular shoulder 41 adjoins the tooth run-out 21.

FIG. 6, while containing an illustration which is otherwise identical to that shown in FIGS. 3 and 5, shows a second securing element in the form of an annular member 60 formed of a plastically deformable hardenable material which adjusts itself between the end face 22 of the hub 13 and the tooth run-out 21 of the driveshaft 11. Because of the shape of the inner profiled teeth 14, an annular recess 23 is formed in the hub 13, which recess, in its longitudinal section, forms inclined supporting face portions 24 which, together with the longitudinal axis, form an angle which is similar to that formed by the run-out portions 21 of the profiled teeth 12 of the driveshaft 11. Also, a conical annular shoulder 41 adjoins the tooth run-out 21. The annular member also engages the annular recess 23.

FIG. 7 shows a substantially similar annular member 70. As a result of the shortened shape of the inner profiled teeth 14, there is formed an annular recess 23 in the hub, which recess, in addition to the end faces 24 inclined in the longitudinal section, includes an inner cylindrical holding face 25. The annular member 70 is axially supported between the end faces 24 of the shortened inner teeth 14 of the hub 13 and the tooth run-out 21 of the outer profiled teeth 12 of the driveshaft 11, while it is radially supported on the holding face 25. Also, a conical annular shoulder 41 adjoins the tooth run-out 21.

FIG. 8 is a figure like FIG. 2 of an additional embodiment. Here the first securing element includes a nut 60 with internal threads 61 with an anti-rotational mechanism 62, such as a securing ring, which engages an external thread 63 at the shaft end and which is in contact with a radial end face of the hub 13.

While the above detailed description describes the preferred embodiment of the present invention, the invention is susceptible to modification, variation, and alteration without deviating from the scope and fair meaning of the subjoined claims.

We claim:

1. A driveshaft assembly comprising:

a driveshaft having external profiled teeth at its end;

a slide-on hub with a shaft bore with corresponding inner profiled teeth;

axial securing means between the driveshaft and the slide-on hub, said axial securing means including first securing means form-fittingly engaging a groove or thread radially cut into and provided at a free end of the driveshaft, said first securing means axially supporting the hub in the direction of the end of the driveshaft;

said external profiled teeth, which are provided at the driveshaft and which, when the hub is fully slid onto the driveshaft while being in contact with the first securing means, extend axially relative to a shaft shank and beyond the length of the hub; and second securing means, with a radially undisturbed profile of the profiled teeth, being supported on a run-out of said profiled teeth of the driveshaft;

said second securing means being plastically formed in-situ and axially supporting the hub in the direction of the shaft shank of the driveshaft.

2. An assembly according to claim 1, wherein said first securing means includes a securing ring engaging an annular groove at the shaft end and being in contact with a radial end face of the hub.

3. An assembly according to claim 1, wherein said first securing means includes a nut with anti-rotation means which engages an external thread at the shaft end and being in contact with a radial end face of the hub.

4. An assembly according to claim 1, wherein said second securing element includes a prefabricated slide-on ring made of plastically deformable metal or plastic.

5. An assembly according to claim 4, wherein said ring form-fittingly engages the external profiled teeth of the driveshaft and is axially supported on the run-out of the profiled teeth.

6. An assembly according to claim 4, wherein said ring, on its inside, is conically smooth and is slid over the external profiled teeth of the driveshaft and is supported on a conical face of the driveshaft which adjoins the run-out of the profiled teeth.

7. An assembly according to claim 4, wherein said ring, on its inside, is cylindrically smooth and is slid over the external profiled teeth of the driveshaft and is supported on a conical face of the driveshaft which adjoins the run-out of the profiled teeth.

8. An assembly according to claim 1, wherein the second securing means includes a ring which is produced in situ of a hardenable formable material and which, in cross-section, engages the profiled teeth of the driveshaft and an associated annular recess of the hub.

9. An assembly according to claim 8, wherein said annular recess in the hub forms a supporting face which is inclined in its longitudinal section and which, together with the longitudinal axis, forms an angle similar to that formed by the run-out of the profiled teeth of the driveshaft.

10. An assembly according to claim 9, wherein, prior to sliding on the hub, a sleeve form-fittingly engages the outer profiled teeth at the shaft end and abuts the tooth run-out and a conical face adjoining the tooth run-out whereby the hub sliding on to the shaft end reaches its final position by plastically deforming the sleeve by radially expanding the sleeve; and axially secures the hub by the first securing means at the end of the driveshaft.

11. An assembly according to claim 9, wherein, prior to sliding on the hub, a sleeve form-fittingly engages the outer profiled teeth at the shaft end and abuts the tooth run-out and a conical face adjoining the tooth run-out whereby the hub sliding on to the shaft end reaches its final position by plastically deforming the sleeve by radially shortening the sleeve; and axially secures the hub by the first securing means at the end of the driveshaft.

* * * * *

UNITED STATES PATENT AND TRADEMARK OFFICE
CERTIFICATE OF CORRECTION

PATENT NO. : 5,536,101
DATED : July 16, 1996
INVENTOR(S) : Peter Schwärzler, Rudolf Beier It is certified that error appears in the above-indentified patent and that said Letters Patent is hereby corrected as shown below:

Column 6, line 42, Claim 11, "engaging" should be --engages--

Signed and Sealed this

Seventeenth Day of December, 1996

Attest:

BRUCE LEHMAN

*Attesting Officer*     *Commissioner of Patents and Trademarks*